United States Patent [19]
Brandau et al.

[11] Patent Number: 6,111,561
[45] Date of Patent: *Aug. 29, 2000

[54] NETWORK STATUS MATRIX

[75] Inventors: Richard J. Brandau, Sudbury; Malipatlola RajiniKanth, Natick, both of Mass.

[73] Assignee: GTE Laboratories Incorporated, Waltham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/497,487

[22] Filed: Jun. 30, 1995

[51] Int. Cl.[7] ........................................... G09G 5/34
[52] U.S. Cl. .......................... 345/121; 345/127; 345/340; 345/342
[58] Field of Search ..................... 395/342, 295, 395/340, 127, 129, 130, 132, 131, 119, 121

[56] References Cited

U.S. PATENT DOCUMENTS

| | | | |
|---|---|---|---|
| 4,790,028 | 12/1988 | Ramage | 345/127 |
| 5,049,873 | 9/1991 | Robins | 340/825.06 |
| 5,187,776 | 2/1993 | Yanker | 345/127 |
| 5,596,703 | 1/1997 | Eick et al. | 345/326 |
| 5,638,523 | 6/1997 | Mullet et al. | 345/130 |

*Primary Examiner*—Richard A. Hjerpe
*Assistant Examiner*—Kent Chang
*Attorney, Agent, or Firm*—Leonard Charles Suchyta; Floyd E. Anderson

[57] ABSTRACT

A computer system for displaying the status of network nodes and links in a large telecommunications network is disclosed. An Overview windowing panel consisting solely of cell bullets representing the connection status of a large number of nodes and links in a telecommunications network is displayed on a computerized display device. The cell bullets are color coded to visually represent the connection status of the nodes and links. A panning rectangle which is moveable under mouse control throughout the Overview windowing panel telescopes the detail of a portion of the densely packed Overview panel onto a second windowing panel, the Detail windowing panel. The Detail windowing panel identifies the node connections displayed therein, and provides further information on the status of the node and connections therein.

7 Claims, 2 Drawing Sheets

NETWORK STATUS MATRIX

FIELD OF THE INVENTION

The current invention relates to a computer system for monitoring communication networks, and more particularly to a computer system for efficiently displaying the status of network nodes and links in a large telecommunications network.

BACKGROUND OF THE INVENTION

In managing a large telecommunications network such as the public telephone network, it is imperative that the current network status be readily available to an operator. Network status has long been displayed as tables of numerical data on video display terminals. Often, these displays are color-coded according to the status indicated by the data values. By paging over many such displays, a network manager can ascertain the status of the managed network. However, tabular displays require time and effort for a user to gather all the information needed to assess the overall status of a large network. By the time the user has gathered sufficient information, some of it will be out of date, so this situation assessment may be faulty. Because of the delay, control responses by the user may be late and incorrect.

More recently, systems have used computer graphics to display geographic maps of the managed network, with network elements and links color-coded according to the status. Map displays show an array of network elements, but are arranged geographically. Unfortunately, such displays necessarily have very low information density.

Using the public telephone network as an example, Switches are scattered non-homogeneously across a service area, and they are usually very highly connected. On a typical map display, connections between only about ten nodes can be shown simultaneously before some lines become impossible to resolve from each other. Although individual switches can be collapsed into a hierarchy of abstract "cluster" nodes, the upper limit of instantaneously displayed complexity is still about 10 nodes and their links, resulting in the other links and nodes being ignored.

The underlying reason that map displays are so information-poor when applied to network management is that they are constrained to be faithful to a geographic structure that is applicable to only a few network problems. Only the network's topological structure is useful for the vast majority of network problems. Hence, a map is inefficient at showing information relevant to network problems. Moreover, because the map is faithful to a questionable structure, it is rarely helpful and often misleading in diagnosing problems.

Using either the conventional tabular or the map approach, the following practical implications result:

Smaller parts of the network must be managed by an individual, thus requiring a larger workforce.

Fewer network problems can be efficiently detected and handled. Thus it is likely that more errors will be made, compromising the quality of service delivered by the network.

Thus it is desirable that network status can be displayed in such a way that the user can observe the overall performance of a very large network and, from the same display, perceive sufficient detail to diagnose network malfunctions.

OBJECTS OF THE INVENTION

It is an object of the invention to obviate the above noted disadvantages of the prior art.

It is a further object of the invention to provide an effective way to view particular network problems as they emerge.

It is a still further object of the invention to provide an efficient and concise display of very large networks, while allowing easy exploration of detail.

SUMMARY OF THE INVENTION

In one aspect of the present invention an Overview windowing panel consisting solely of cell bullets representing the connection status of a large number of nodes and links in a telecommunications network is displayed on a computerized display device. The cell bullets are color coded to visually represent the connection status of the nodes and links. A panning rectangle which is moveable under mouse control throughout the Overview windowing panel telescopes the detail of a portion of the densely packed Overview panel onto a second windowing panel, the Detail windowing panel. The Detail windowing panel identifies the node connections displayed therein, and provides further information on the status of the node and connections therein.

DETAILED DESCRIPTION OF THE PREFERRED EMBODIMENT

Figure 1:
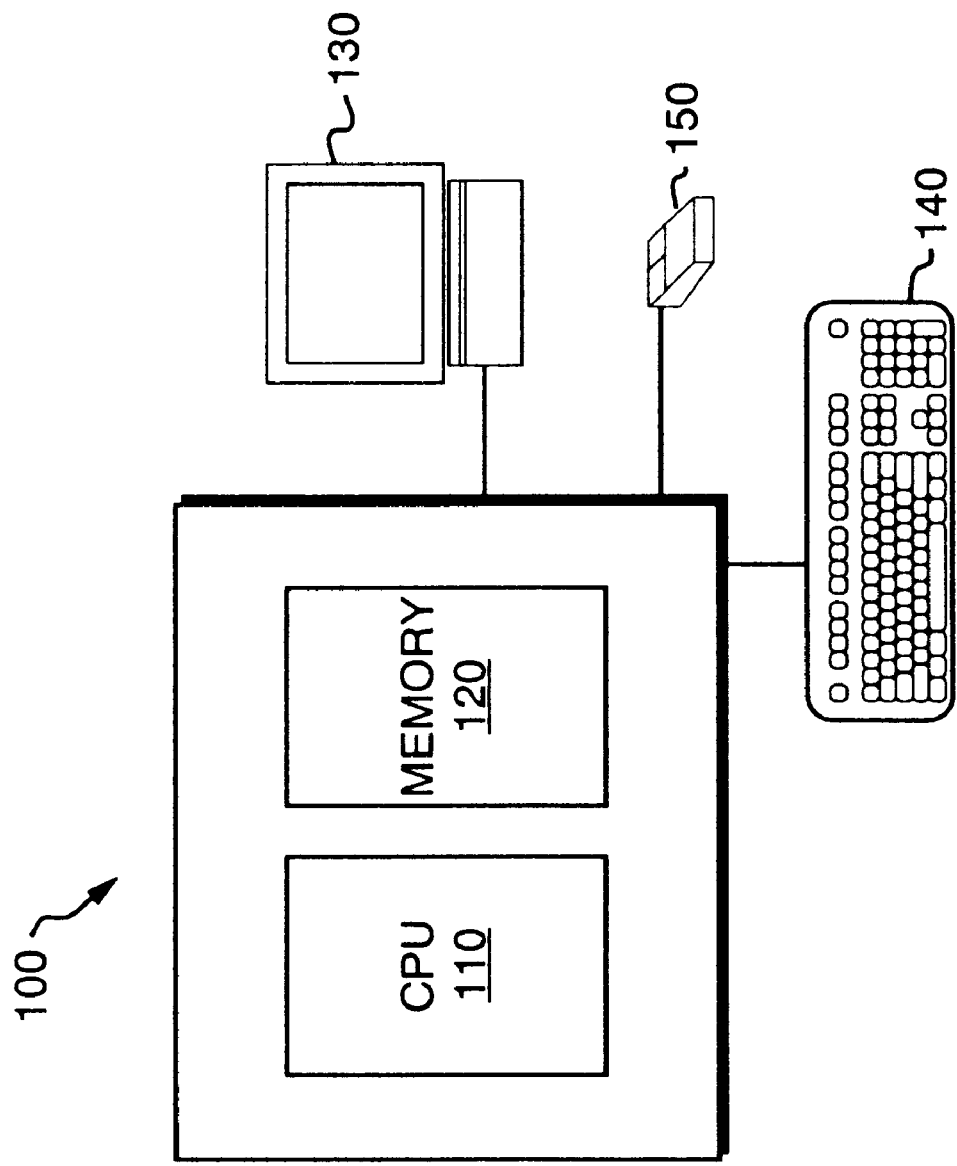
FIG. 1 depicts a conventional computer system in which the present invention is embodied.

The Network Status Matrix, embodying the current invention, is a computer program that executes on a conventional computer system as shown in FIG. 1. This computer system 100 has a central processing unit (CPU) 110 for executing the program instructions of the Network Status Matrix. The CPU 110 is coupled to a memory 120 for storing the program instructions of the Network Status Matrix, and also a display device 130 consisting of a cathode ray tube (CRT) for presenting the results of the Network Status Matrix. Commands are input to the computer program using a conventional keyboard 140 or mouse 150. The computer program of the instant invention is created using a conventional programming language for operation on computer system 100. It will be apparent to those skilled in the art that many computer programming languages or software packages may be used to create the Network Status Matrix. Since the programming of the Network Status Matrix is conventional, this description shall focus on the user interface of the Network Status Matrix which is not conventional.

Figure 2:
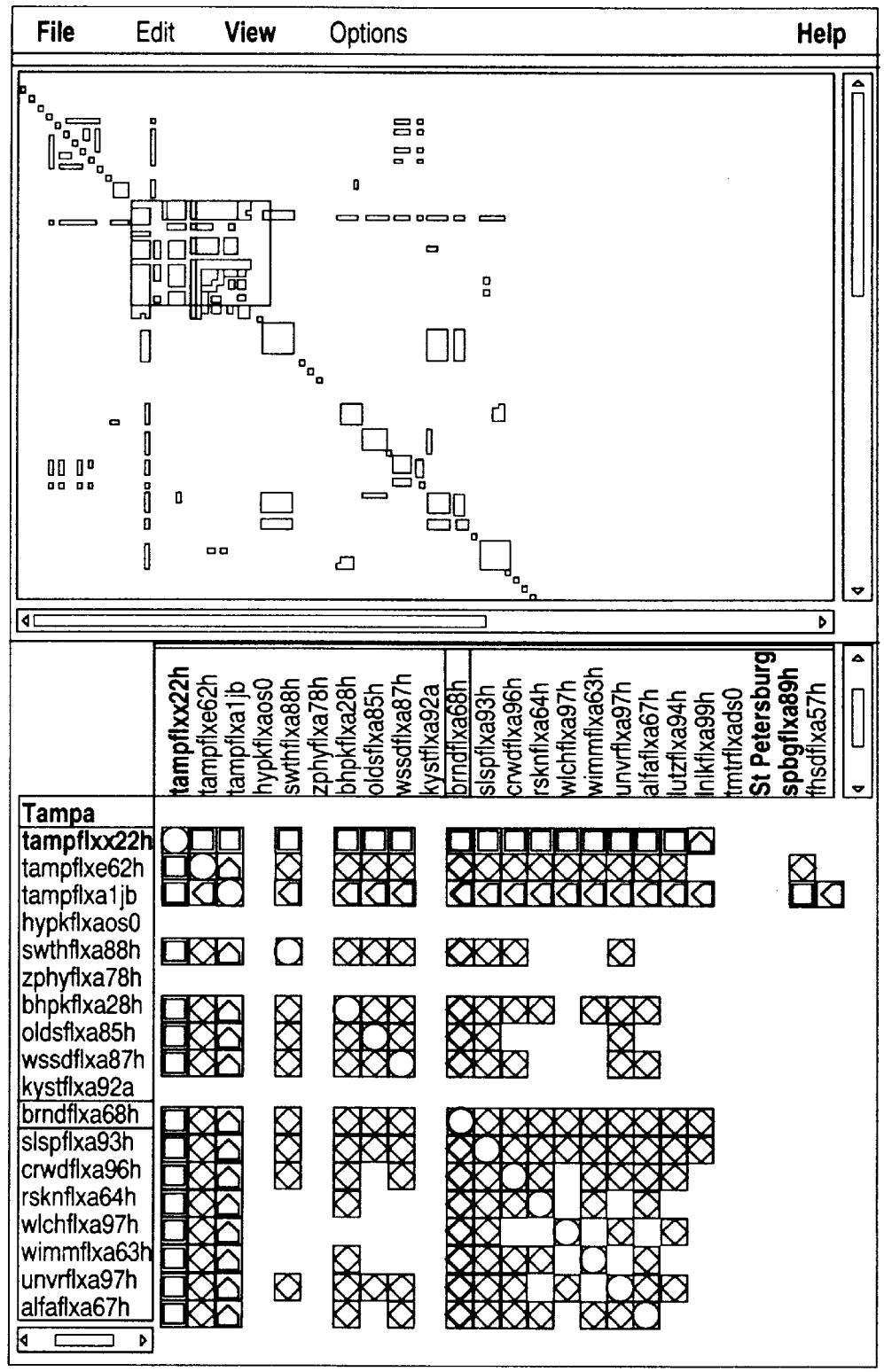
FIG. 2 depicts a visualization of an Overview panel and a Detail panel of the present invention.

Referring to FIG. 2, the user interface of the Network Status Matrix consists of two main display areas: an "Overview" pane 210, and a "Detail" pane 220. The Detail pane 220 contains an expanded view of a region of the Overview pane 210. The particular Overview region that is expanded is outlined by a rectangle 230, which is called a panner. The user drags this rectangle or panner 230 using the mouse across the Overview pane 210 to manipulate which region will be displayed in the Detail pane 220.

Both panes 210 and 220, display similar information, at different levels of granularity of detail. The information is presented in the Overview pane 210 as a "switch-by-switch matrix"—a two-dimensional array of cells, where both rows and columns represent switches. However, there are no headings on the rows or columns identifying the individual switches, due to the high density of the representation. For example in a window on a display having a horizontal width of approximately 5½ inches wide by a vertical length of 3½, approximately 180 switches can be represented in the horizontal and 120 switches can be represented on the vertical. Thus in this rather small area, the status of 21,600, (180× 120), switch connections can be displayed. This large population is possible since each switch connection is represented by only a 3 pixels wide square on the display, although a one pixel wide representation may be adequate depending on the resolution of the display device.

An individual cell, represented as "bullet", identifies the connection between the row switch and the column switch, or, for cells on the main diagonal, where the row and column switches are the same, the switch itself. The intersection of the horizontal and vertical switches represents the status of the connection. Cells representing switch pairs that are not connected are empty, and displayed in the background color. Filled cells are color-coded according to the severity of the most significant "alarm" for the link, as reported by the row switch. In one embodiment of the invention, each switch connection is represented by a 3 pixel wide square bullet on the display. Links between two switches that both report status to the system are represented twice in the matrix, symmetrically about the main diagonal: each cell representing one of the switches' reports about that link. In some instances, there may be trunk group destinations that do not report to the system thus there may be more columns than rows. For this reason, and because the display can be hierarchically contracted as described below, the "main diagonal" of switch cells can be horizontally offset at cluster boundaries.

As the mouse is moved over an active area of the screen, a description of the area is reported in a special "mouse documentation" window. In the case of the Overview pane 210 of the Network Status Matrix, the pointer location is reported, in the form of the complete hierarchical description ("<region>.<lata>.<access_tdm>.<local_tdm>, <end_office_or_trunk_group>" together with a description of what happens if particular buttons were pressed at that location ("left: center Detail pane on this location"). Location information is particularly useful in the Overview pane due to the fact that the display is very dense and there is little room for other labels.

In the Detail window pane 220, the shape of a cell is coded according to the type of object it represents: circles represent nodes, up-arrows represent one-way trunk groups from the row switch to the column switch (the arrow points toward the switch to which the trunk group is directed), left-arrows represent one-way trunk groups to the row switch, and diamonds represent two-way trunk groups. Squares represent multiple trunk groups between the two switches; when activated by a mouse click, these cells produce a pop-up-window containing the individual trunk groups that are summarized by the square.

Mouse selection of individual switch and/or trunk group cells in the Detail window pane 220 adds the trunk group or switch to a set of "selected" elements whereupon application specific operations may be executed to control the switches and trunk groups. The operations are selected from a pop-up menu of alternates.

This matrix arrangement of the switches advantageously allows certain crucial network problems to readily appear as obvious patterns on the display. Specifically, as a switch becomes congested, links to that switch begin to report difficulty completing connections to the switch, and a vertical line of colored cells (representing these trunk group complaints) will form in the column for that switch. If a switch fails to report data, a horizontal line will form (indicating missing data) in the row for that switch. If a switch fails completely, it will cease reporting data, and trunk groups to that switch will report problems, and a "cross" forms on the display.

Because human vision is particularly adept at recognizing lines, these patterns can be readily observed even in the very compact Overview pane 210 of the display. Thus, one can efficiently monitor the operation of a very large network.

If all switches in a network are listed in a random or haphazard fashion in the rows and columns, it is likely that the matrix display would be very sparse. However, networks typically contain "clusters" of high connectivity, thus a natural grouping of switches exists to order the switches. This grouping provides that relatively dense areas of the Matrix will be likely displayed along the main diagonal.

These clusters can be further organized into a hierarchy. Continuing along an example utilizing the public switched telephone network, the following five-level hierarchy might be established: end offices, "local tandem" clusters, "access tandem" clusters, LATAs, and states or regions. The extent of a network manager's responsibility is generally defined by this hierarchy (e.g., "the Los Angeles and Palm Springs telephone areas"), although these assignments are fluid during a workstation session. The responsibility of a manager may increase or decrease for many reasons.

To support this mode of operation, the Network Matrix Switch application provides hierarchical "expansion" and "contraction" of the display, making it easy to monitor the overall status of some parts of the network, while performing detailed analysis and surveillance of the areas of principle responsibility. This expansion and contraction is performed by manipulating the row and column labels on the Detail pane 220. The labels are push buttons that can be "opened" (double-clicked) to expand the hierarchy beneath, or "closed" (shift-double- clicked) to collapse into the hierarchical parent.

While there has been shown and described what is at present considered the preferred embodiment of the invention it will be obvious to those skilled in the art that various changes and modifications may be made therein without departing from the invention as defined by the appended claims.

What is claimed:

1. A display device for viewing the connection status of nodes and links in a telecommunications network comprising:

a first overview display window means consisting of bullets representing the connection status of said nodes and links arranged in a matrix where both row and columns represent said nodes;

a panner means for selecting a subset of the first window display means;

a second detail display window means responsive to the panner means and the first overview display window means for additionally identifying the nodes and displaying the connection status of the nodes selected by the panner means, whereby predetermined network problems appear as patterns of cell representations about row and column lines including a formation of a line pattern in a first direction representing congested switches, and a formation of a line pattern in a second direction representing missing data.

2. The display device of claim 1 wherein the bullets representing the connection status of said nodes and links are color coded.

3. The display device according to claim 1 wherein said matrix representing said nodes displays such nodes as a switch-by-switch matrix wherein each said bullet on a main diagonal represent like row and column positions.

4. The display device according to claim 3 wherein said second display window means for identifying the nodes includes row and column labels wherein row and columns are expanded or contracted by selecting a corresponding row or column label, respectively.

5. A method for displaying a connection status of nodes and links in a telecommunication network on a computerized display device, said method comprising steps of:

(a) displaying cells in an overview window, wherein said cells are coded to visually represent a switch status of said nodes and links, wherein said cells are arranged in at least a two dimensional array of rows and columns in a switch-by-switch matrix such that each cell identifies a connection between a row switch and a column switch;

(b) selecting a portion of said overview window for further identifying a portion of said cells; and (c) displaying a detail window for further displaying said selected portion in greater detail and additionally displaying row and column headings identifying corresponding cells in respective rows and columns, said row and column headings selectable for causing an expansion or subsequent contraction of a corresponding row or column, whereby predetermined network problems appear as patterns of cell representations about row and column lines including a formation of a cross pattern representing a switch failure.

6. The method according to claim 5 wherein each cell identifies a connection status between a row switch and a column switch according to a predetermined color and a predetermined symbol.

7. The method according to claim 5 wherein said cells are arranged to form a main diagonal such that links between row and column switches are represented twice in the matrix, symmetrically about the main diagonal.

* * * * *